United States Patent [19]

Borland

[11] 4,287,556

[45] Sep. 1, 1981

[54] CAPACITIVE CURRENT LIMITING INVERTER

[75] Inventor: Walter G. Borland, Fort Wayne, Ind.

[73] Assignee: General Electric Company, Salem, Va.

[21] Appl. No.: 104,682

[22] Filed: Dec. 17, 1979

[51] Int. Cl.³ ............................................. H02M 1/08
[52] U.S. Cl. ......................................... 363/41; 363/95; 307/261; 307/265; 307/555
[58] Field of Search .................. 363/26, 41, 95–98, 363/131; 307/237, 261, 263, 264, 265, 268

[56] References Cited

U.S. PATENT DOCUMENTS

| 3,402,353 | 9/1968 | Hubbs | 307/261 |
| 4,002,963 | 1/1977 | Hunter | 363/41 X |
| 4,029,972 | 6/1977 | Fox et al. | 307/263 |

Primary Examiner—William M. Shoop
Assistant Examiner—Peter S. Wong
Attorney, Agent, or Firm—James H. Beusse

[57] ABSTRACT

A trapezoidal reference voltage waveform is provided to a PWM inverter for synthesizing an inverter output voltage waveform having substantially the same shape as the reference for effecting limiting of peak capacitive current at the output of a high-leakage reactance transformer fed by the inverter.

7 Claims, 4 Drawing Figures

CAPACITIVE CURRENT LIMITING INVERTER

BACKGROUND OF THE INVENTION

1. Field of the Invention

The present invention relates to a high-voltage AC power supply having means for limiting peak capacitive current to a load having a substantial capacitive component, and more particularly, to such an AC power supply including a pulse-width modulated inverter and means for synthesizing a trapezoidal inverter output voltage waveform to be supplied to a complex load, such as, for example, a corotron in a reprographic machine.

2. Description of the Prior Art

High-frequency inverter circuits are often used to convert DC electrical energy to AC electrical energy. In many applications, a square wave output is desirable either for functional considerations or because of the simplicity of not requiring costly filters, and the like, necessary to produce a sine wave output.

A square wave output may be generated from various types of inverter circuits such as half-bridge, full-bridge, flyback, and the like. In all cases, the rise and fall times of the square waveform are controlled by the switching times of various types of semiconductor devices and by passive LCR circuit components necessary to a given design. Because of this, the rise and fall times generally assume an exponential form which, in turn, produces high peak currents in a load having a substantial capacitive component, as for example, in a complex load such as a charge corotron useful in reprographic machines. An exponential waveform, in turn, can produce severe stresses on semiconductors required to handle the current.

It is desirable, in high-voltage AC power supplies having inverter circuits for converting DC electrical energy to AC electrical energy, to maintain peak capacitive currents as small as possible in an effort to reduce the stress on the switching transistors thereby to improve the overall reliability of the power supply. Most present day inverter circuits accomplish this by slowing down the rise and fall times of the inverter circuit; this can have other adverse affects such as increasing losses in the inverter circuit.

It is, therefore, an object of the present invention to accomplish the lowering of the aforementioned peak capacitive currents from a high-voltage AC power supply to a load having a substantial capacitive component without sacrificing rise times and circuit efficiency, thereby to improve circuit reliability.

SUMMARY OF THE INVENTION

In carrying out the object of my invention, in one form, there is provided a high-voltage AC power supply having means for limiting peak capacitive current into a load having a substantial capacitive component. Included in the circuit is a DC electrical energy source and a pulse width modulated inverter for converting DC electrical energy from the source to AC electrical energy. A transformer is included having a pair of output terminals for connection to the load, the transformer serving to transform the AC electrical energy from the inverter to high voltage AC electrical energy to be delivered to the load and to provide isolation between the DC electrical energy source and the AC electrical energy delivered to the output terminals. Also included are means for providing to the pulse width modulated inverter a reference voltage waveform having substantially linear rise and fall times and having a substantially flat top during positive and negative peaks for synthesizing an inverter output voltage waveform having substantially the same shape as said reference voltage waveform, whereby peak capacitive current at the transformer output terminals, and thus through the switching elements of the inverter, is limited during the rise and fall times by the shape of the inverter output voltage waveform to a value substantially less than a waveform with exponential rise and fall times.

DESCRIPTION OF THE PREFERRED EMBODIMENT

Figure 1:
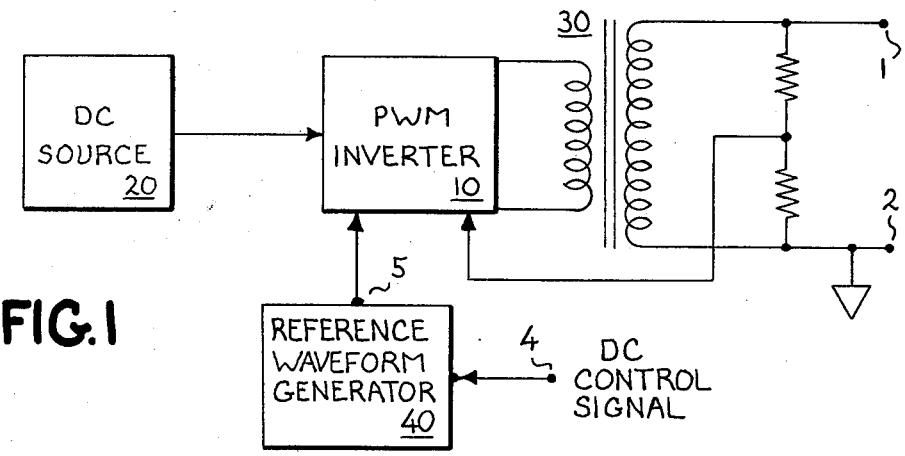
FIG. 1 shows by schematic representation, partially in block form, the preferred embodiment of the high-voltage AC power supply of the present invention.

In accordance with the present invention, and referring now to FIG. 1, there is shown the preferred embodiment of a high-voltage AC power supply having means for limiting peak capacitive current into a load having a substantial capacitive component. A pulse width modulated (PWM) inverter 10 is provided for converting DC electrical energy from DC source 20 to AC electrical energy. A transformer 30 of the high-leakage reactance type includes a pair of output terminals 1 and 2 for connection to a load. Such a load would, as hereinbefore stated, include a substantial capacitive component, as is the case in a complex load. A corotron as used in reprographic equipment is such a complex load. Transformer 30 serves to transform the AC electrical energy from inverter 10 to high-voltage AC electrical energy to be delivered to the load at terminals 1 and 2. It also serves to provide isolation between the DC energy source 20 and the AC electrical energy delivered to the output terminals 1 and 2. Means are also included for providing to the PWM inverter a reference voltage waveform having substantially linear rise and fall times and having a substantially flat top during positive and negative peaks for synthesizing an inverter output voltage waveform having substantially the same shape as said reference voltage waveform; such takes the form of reference waveform generator 40. Reference waveform generator 40 is capable of providing a trapezoidal voltage waveform from a square wave input as shown in FIG. 2.

Figure 2:
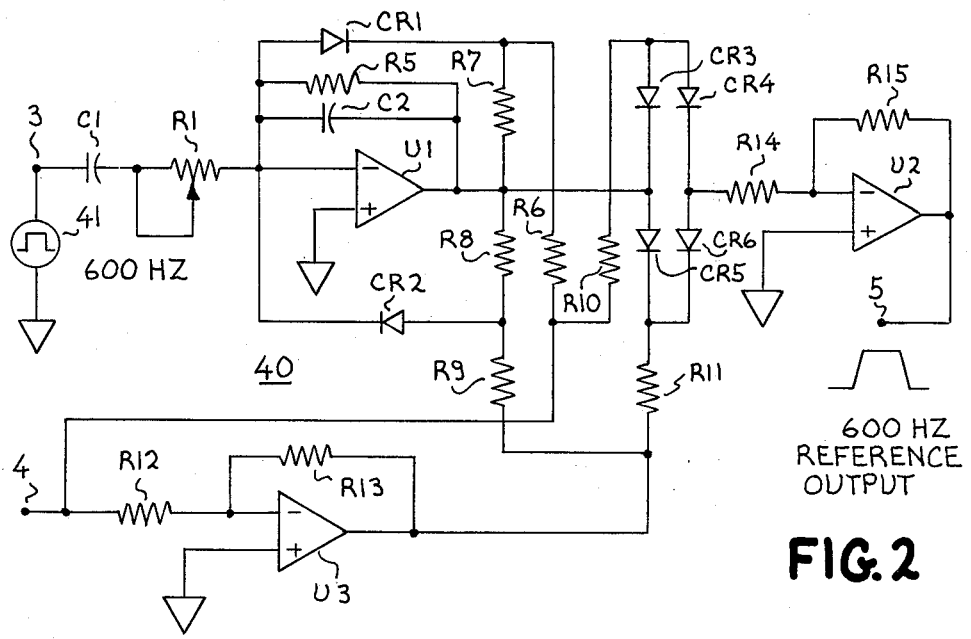
FIG. 2 is a detailed schematic representation of the preferred embodiment of the reference waveform generator of FIG. 1.

Referring now to FIG. 2, there is shown the preferred embodiment of the circuit of reference voltage waveform generator 40. An oscillator 41 capable of generating a 600 Hz square wave feeds this output square wave through pin 3 to an integrator including operational amplifier, op amp, U1 and its associated circuitry so as to generate a triangular voltage waveform having the desired linear slope for the rise and fall times of the output waveform. Means are provided for controlling the rise and fall times of the reference voltage waveform thereby to control the level of peak capacitive current at the output terminals 1 and 2 of transformer 30. Such takes the form of a potentiometer R1 used to provide an adjustment for the rise and fall times of the output from the integrator. Potentiometer R1 and capacitor C2 determine the time constant of the integrator. Capacitor C1 is used to block any DC component which may be present at the input at pin 3.

In order not to introduce delays during the integration period, it is necessary to prevent op amp U1 from saturating. Such is the purpose of the clamp circuit including diodes CR1 and CR2, and resistors R6, R7, R8, and R9.

Diodes CR3, CR4, CR5, and CR6 and resistors R10 and R11 form a bridge clipper circuit. This bridge clipper in conjunction with op amp U3 form a variable clipper circuit—means for controlling peak to peak amplitude of the reference waveform—the clip level of which is determined by the DC voltage supplied to the input of op amp U3 at pin 4. In other words, the variable clipper, in response to a DC control signal, serves to control the peak amplitude of the reference waveform. Such a DC control signal could be used as an open loop control signal or could be provided by a feedback signal. Such a feedback signal could be derived from either the output voltage or output current and used to regulate or control same. For example, the DC control signal may be provided from a feedback circuit having as its input a voltage derived from a sensing resistor connected serially with a load across output terminals 1 and 2, this voltage being compared with a reference voltage thereby producing an error signal—the DC control signal—to be fed to pin 4, and thus automatically regulating output current by controlling output voltage.

Op amp U2 and resistors R14 and R15 form a unity gain amplifier used to buffer the output from the clipper circuit so that loading will not distort the output waveform.

Reference waveform generator 40 produces, at pin 5, a 600 Hz trapezoidal reference voltage waveform output as shown in FIG. 2. This trapezoidal reference voltage waveform then is fed to the control circuit of the PWM inverter. The result is that peak capacitive current at the output terminals 1 and 2 of the transformer 30 and thus through the switching elements of the inverter 10 is limited by the shape of the inverter output voltage waveform during the rise and fall times to a value substantially less than a waveform with exponential rise and fall times.

The reference voltage waveform controls the output voltage waveform in a manner familiar to those skilled in the art where the reference waveform pulse width modulates the inverter at a frequency determined by the frequency of the reference waveform. The basic frequency of the inverter is much higher than the reference waveform frequency and this higher frequency component is filtered out by leakage reactances inherent in output transformer 30 and stray capacitances present at the output terminals 1 and 2. What remains then at the output terminals is a voltage waveform having the same frequency and shape as the modulating signal, in our case, the reference waveform. Inverter operation in this mode may be more familiar to those skilled in the art as Class "D" operation.

Figure 3:
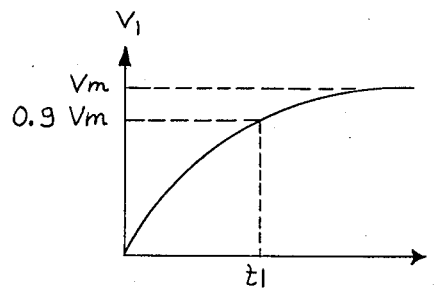
FIG. 3 shows graphically a voltage vs. time plot of a waveform having an exponential rise time.
Figure 4:
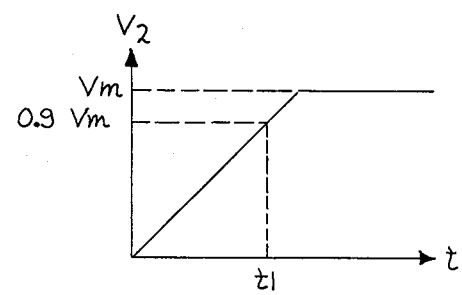
FIG. 4 shows graphically a voltage vs. time plot of a waveform having a linear rise time.

Referring now to FIG. 3, there is shown the exponential rise time of the voltage waveform present in a typical inverter of the pulse-width modulated type, while FIG. 4 shows the rise time resulting from the present invention. Reduction in peak currents can be determined as follows:

$V_1$ as shown in FIG. 3 can be expressed as:

$$V_1 = V_m - V_m e^{-t/\tau}$$

$V_2$ as shown in FIG. 4 can be expressed as:

$$V_2 = (0.9 V_m/t_1)t$$

The capacitive current produced by both types of waveforms can be shown as:

$$i_{c1} = C\frac{dv_1}{dt} = \frac{CV_m}{\tau} e^{-t/\tau}$$

$$i_{c2} = C\frac{dv_2}{dt} = \frac{0.9 V_m}{t_1} C$$

The time constant $\tau$ can be shown to be:

$$\tau = \frac{t_1}{\ln \frac{V_m}{V_m - 0.9 V_m}} = \frac{t_1}{\ln 10} = \frac{t_1}{2.3}$$

The peak current produced by the waveform shown in FIG. 3 will occur at t=0. Hence:

$$i_{1pk} = \frac{CV_m}{\tau} = 2.3 \, C \frac{V_m}{t_1}$$

The peak current produced by the waveform shown in FIG. 4 will be constant and can be expressed as shown above, or:

$$i_{2pk} = (0.9 V_m/t_1)C$$

The reduction in the peak capacitive currents using the waveform shown in FIG. 4 can be represented by the ratio:

$$\frac{i_{2pk}}{i_{1pk}} = \frac{0.9 V_m C}{t_1} \Big/ \frac{2.3 V_m C}{t_1} = \frac{0.9}{2.3} \approx 0.4$$

As can be seen from the preceding calculation, the peak capacitive currents produced by the subject invention for waveform control are approximately 40% those of currents found in most other inverter circuits. It should be apparent to those skilled in the art that this will greatly reduce the stress on the inverter switching transistors and should result in improved reliability and life since these devices are probably most prone to failure in a typical inverter.

The output on pin 5 of the reference waveform generator 40 of FIG. 2 is a voltage waveform having a variable peak amplitude and whose rise and fall times are linear and of constant slope regardless of the peak amplitudes of the output voltage. When this waveform is supplied to the inverter of FIG. 1, the result is the reduction of peak capacitive current delivered to a load having substantial capacitive component, such as for example in a complex load.

A circuit as shown in FIG. 1 has been constructed and has operated satisfactorily to produce load currents of from 0.4 to 1.5 milliamps RMS (resistive) and an output voltage (peak to peak) of from 10.5 to 18 KV at 600 Hz. Such output voltage has a crest factor less than or equal to 1.2 and with a rise time of approximately 150 microseconds. Regulation is plus or minus 2% over the specified input voltage range. Such has been accomplished through the use of reference waveform generator 40 as shown in FIG. 2 with components having the following values or designations:

| Component | | Value/Designation |
|---|---|---|
| Resistor | R1,R10,R11, R12,R13 | 100K ohm |
| | R5 | 1M ohm |
| | R6,R9 | 15K ohm |
| | R7,R8 | 7.5K ohm |
| | R14,R15 | 39.2K ohm |
| Capacitor | C1 | 0.47 μf, |
| | C2 | .002 μf. |
| Diodes | CR1 CR2 CR3 CR4 CR5 CR6 | 1N4454 |
| Op Amp | U1 | ¼LM324 National Semiconductor |
| | U2 | ¼LM324 National Semiconductor |
| | U3 | ¼LM324 National Semiconductor |

It should be apparent to those skilled in the art that the embodiment described heretofore is considered to be the presently preferred form of the invention; modifications and variations are possible in light of the above teachings. It is understood, therefore, in accordance with the Patent Statutes, that the invention may within the scope of the appended claims be practiced otherwise than as specifically described.

What is claimed is:

1. A high voltage AC power supply having means for limiting peak capacitive current into a load having a substantial capacitive component, comprising:
   a DC electrical energy source;
   a pulse-width modulated (PWM) inverter for converting DC electrical energy to AC electrical energy;
   a transformer including a pair of output terminals for connection to the load, the transformer serving to transform the AC electrical energy from the inverter to high voltage AC electrical energy to be delivered to the load and to provide isolation between the DC electrical energy source and the AC electrical energy delivered to the output terminals;
   means for providing to the PWM inverter a reference voltage waveform having substantially linear rise and fall times and having a substantially flat top during positive and negative peaks for synthesizing an inverter output voltage waveform having substantially the same shape as said reference voltage waveform; whereby, peak capacitive current at the transformer output terminals and thus through the switching elements of the inverter is limited during the rise and fall times by the shape of the inverter output voltage waveform to a value substantially less than a waveform with exponential rise and fall times.

2. The invention of claim 1 wherein the means for providing is a reference voltage waveform generator capable of providing a reference voltage waveform having substantially linear rise and fall times and having a substantially flat top during positive and negative peaks of the voltage waveform.

3. The invention of claim 2 wherein the reference voltage waveform is a trapezoidal voltage waveform.

4. The invention of claim 1 wherein the transformer is of the high leakage reactance type serving further to filter out the high frequency component of the AC electrical energy.

5. The invention of claim 1 further comprising:
   means for controlling the rise and fall times of the reference voltage waveform thereby to control the level of peak capacitive current at the transformer output terminals.

6. The invention of claim 1 further comprising:
   means for controlling peak to peak amplitude of the reference voltage waveform thereby to control peak to peak amplitude of the inverter output voltage waveform.

7. The invention of claim 6 wherein the means for controlling peak to peak amplitude of the reference voltage waveform is a variable clipper circuit having as its input a DC control signal, a feedback signal derived from and proportional to the output voltage delivered to the load.

* * * * *